United States Patent
Choi et al.

(10) Patent No.: US 8,621,043 B2
(45) Date of Patent: Dec. 31, 2013

(54) METHOD AND SYSTEM FOR CREATING A BULLETIN BOARD SYSTEM (BBS) MESSAGE INCLUDING A MAP THROUGH A COMMUNICATION NETWORK

(75) Inventors: Woo Ii Choi, Seoul (KR); Yoo Sun Roh, Seoul (KR)

(73) Assignee: Yahoo! Inc., Sunnyvale, CA (US)

( * ) Notice: Subject to any disclaimer, the term of this patent is extended or adjusted under 35 U.S.C. 154(b) by 862 days.

(21) Appl. No.: 11/875,568

(22) Filed: Oct. 19, 2007

(65) Prior Publication Data

US 2009/0055509 A1 Feb. 26, 2009

(30) Foreign Application Priority Data

Aug. 20, 2007 (KR) .................. 10-2007-0083261

(51) Int. Cl.
*G06F 15/16* (2006.01)
(52) U.S. Cl.
USPC .......................................... 709/219; 709/204
(58) Field of Classification Search
USPC .................. 709/219, 217, 204, 213
See application file for complete search history.

(56) References Cited

U.S. PATENT DOCUMENTS

| 8,155,885 B2 | 4/2012 | Kwon et al. |
| 2001/0018704 A1* | 8/2001 | Kikugawa ..................... 709/206 |
| 2007/0288509 A1* | 12/2007 | Bastani et al. ............ 707/103 R |

FOREIGN PATENT DOCUMENTS

| KR | 1020000050088 A | 8/2000 |
| KR | 1020020030467 A | 4/2002 |
| KR | 1020070058757 A | 6/2007 |
| WO | WO 2007002800 | 1/2007 |

OTHER PUBLICATIONS

Preliminary Rejection for Korean Patent Application 10-2007-83261 and English translation, Feb. 1, 2010.

* cited by examiner

*Primary Examiner* — Afshawn Towfighi
(74) *Attorney, Agent, or Firm* — James J. DeCarlo; Greenberg Traurig, LLP (57) ABSTRACT

In one embodiment of the present invention, there is provided a method for creating a bulletin board system (BBS) message including a map through a communication network. According to said embodiment, upon receiving a request to post a message, it is determined whether a user wishes to include a map to the message. If it is determined that the user wishes to include a map to the message, then a location mapping interface facilitating configuration of a user-defined map is provided to the user and a map defined by the user with the location mapping interface is inserted in the message. The user may add one or more map items such as symbols showing the locations of interest and annotations in the map. Upon receiving the user's request to display a map included in the message, a map corresponding to the user's request is retrieved from the map server and displayed to the user. The map information of the displayed map and the message are stored in a database.

23 Claims, 9 Drawing Sheets

METHOD AND SYSTEM FOR CREATING A BULLETIN BOARD SYSTEM (BBS) MESSAGE INCLUDING A MAP THROUGH A COMMUNICATION NETWORK

TECHNICAL FIELD

The present disclosure generally relates to providing a Bulletin Board System (BBS) over a communication network.

BACKGROUND

Bulletin Board Systems allow users to post and download public messages. These Bulletin Board Systems typically have many different file libraries and discussion groups such that clients can communicate with one another through an on-line connection. Users of such network systems can post messages to various groups within the Bulletin Board Systems such that many different clients can read their messages. For example, a client may post a message to the Bulletin Board System requesting information on a particular subject. Other users of the network service will read this message and can respond by posting messages of their own, which include an answer. All of these messages are publicly available and can be usually read by any user.

Unfortunately, a BBS message provided in the Bulletin Board Systems is limited to a particular data type (e.g., text document, image, animation, audio, etc.). That is, the range of information to be delivered through a Bulletin Board System is typically limited. However, the limitation on the data types to be included in the BBS message is not convenient for a user hoping to provide more sufficient information on the subject. For example, when a user tries to post a new message on the Bulletin Board System regarding his/her favorite restaurant around the Kangnam station, although the location of the restaurant is the key information on the subject, the conventional Bulletin Board Systems do not include the map in the BBS message. In addition, the map in the BBS messages can be applied to various subjects including location information, such as "recommendation for vacations," "real estate," "sightseeing," etc.

SUMMARY

In certain embodiments of the present invention, there is provided a method for providing a bulletin board system (BBS) including a map over a communication network at a user side entering a new posting. According to said embodiments, upon receiving a request to post a message from a user, it is determined whether the user wishes to include a map to the message. If it is determined that the user wishes to include a map to the message, then a location mapping interface facilitating configuration of a user-defined map is provided to the user and a map defined by the user with the location mapping interface is inserted in the message. The map with the message is stored in a database.

In another embodiment of the present invention, there is provided a system for providing a Bulletin Board System (BBS) including a map over a communication network. The system comprises a host computer center and one or more client computers. The host computer center houses a network of one or more servers such as a BBS server map server, etc. The client computer communicates with the host computer center through the network. The host computer center includes a BBS server and a map server to provide a BBS including at least one message with a map.

SUMMARY

In certain embodiments of the present invention, there is provided a method for providing a bulletin board system (BBS) message including a map through a communication network at a user side entering a new posting. According to said embodiments, upon receiving a request to post a message from a user, it is determined whether the user wishes to include a map to the message. If it is determined that the user wishes to include a map to the message, then a location mapping interface facilitating configuration of a user-defined map is provided to the user and a map defined by the user with the location mapping interface is inserted in the message. The map with the message is stored in a database.

In another embodiment of the present invention, there is provided a system for providing a Bulletin Board System (BBS) including a map over a communication network. The system comprises a host computer center and one or more client computers. The host computer center houses a network of one or more servers such as a BBS server, map server, etc. The client computer communicates with the host computer center through the network. The host computer center includes a BBS server and a map server to provide a BBS including at least one message with a map.

DESCRIPTION OF EXAMPLE EMBODIMENTS

Figure 9:
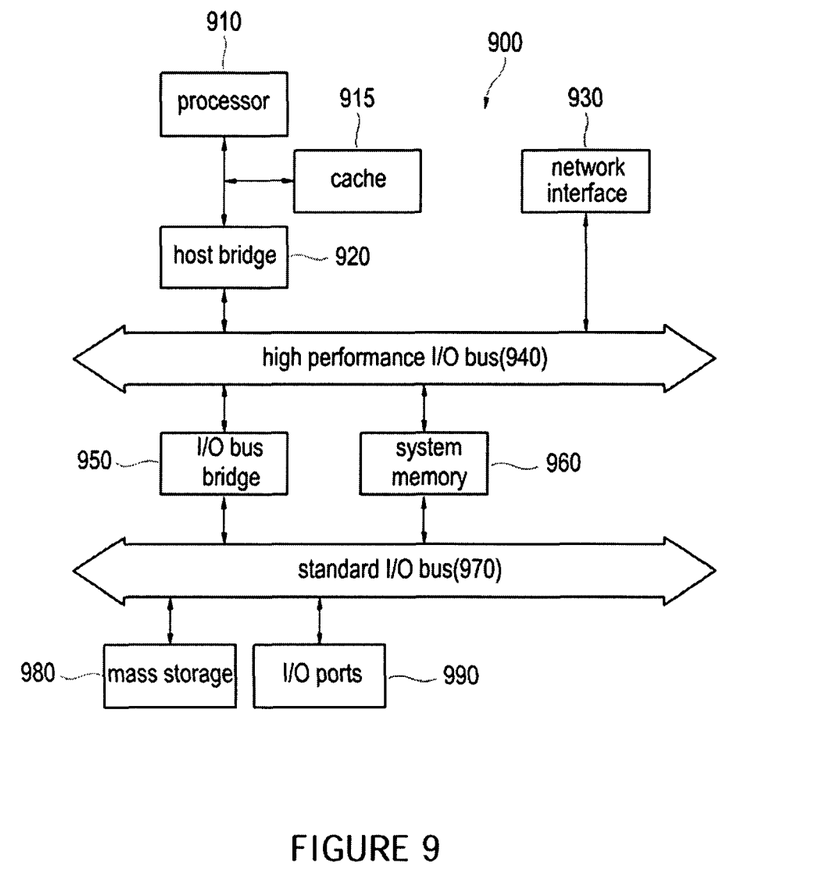
FIG. 9 illustrates a computing system architecture, which may be used to implement a system or method according to one embodiment of the present invention.

FIG. 9 illustrates a computing system architecture, which may be used to implement a system or method according to one embodiment of the present invention.

Various embodiments of the present invention will be described below in detail with reference to the accompanying drawings. It will be apparent, however, that such embodiments may be practiced without some or all of these specific details. In other instances, well known process steps or elements have not been described in detail so as not to unnecessarily obscure the description of the invention.

Figure 1:
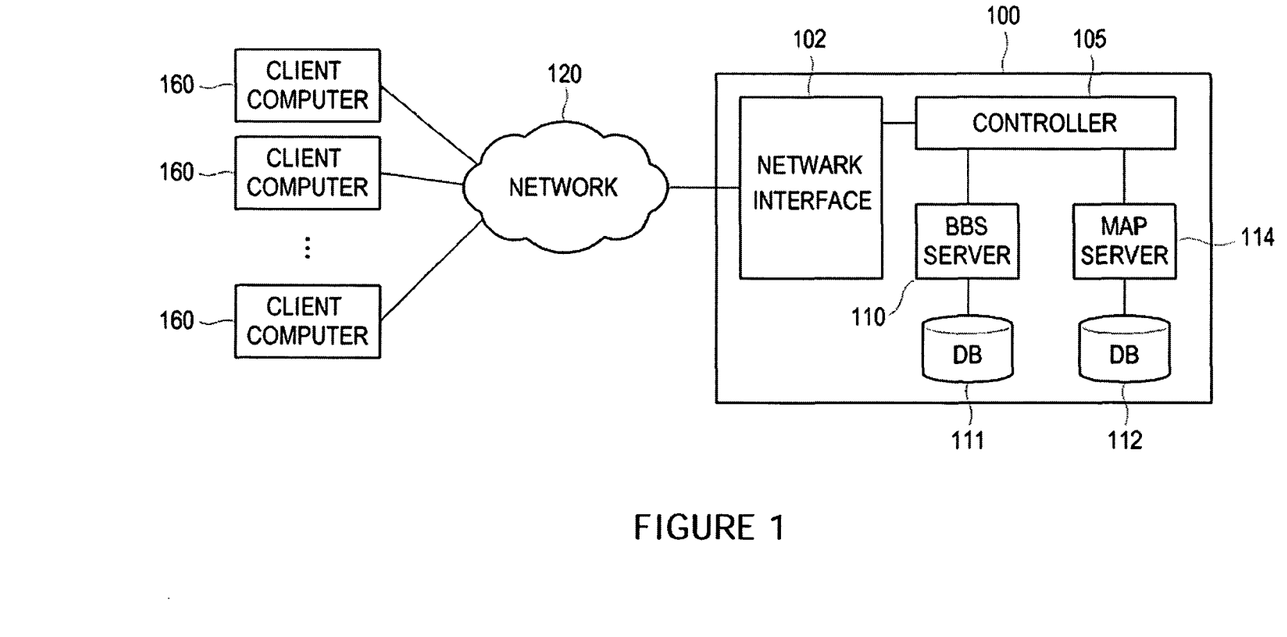
FIG. 1 is a block diagram of a bulletin board system providing a map in accordance with one embodiment of the present invention.

FIG. 1 shows a configuration of a system for providing a bulletin board system for creating a BBS message including a map through a communication network in accordance with one embodiment of the present invention. Referring to FIG. 1, there are provided a plurality of client computers 160 communicatively coupled by a network 120 to a host computer center 100. The network 120 is preferably the Internet or other similar wide area network, which is provided by one or more telecommunications companies and allows a client computer 160 to access the host computer center 100 over a wide geographic area.

The client computer 160 includes software for reading and posting messages to and from a publicly accessible location on a computer network. That is, the client computer 160 is controlled primarily by computer readable instructions, which can be in the form of software, by any means in which such software is stored or accessed. Such software may be a general purpose browser application or any type of software modules that can be plugged in the general purpose browser application, which is executed within the Central Processing Unit (CPU) of the client computer 160 to cause the client computer 160 to operate. In the present invention, the software further supports a user to request the map information and display the map information obtained on a display. In another aspect of the present invention, such software may be downloaded from a BBS immediately before requesting to insert a map or reading an inserted map. The client computer may be a laptop, notebook, desktop or other types of computing device, as well as a personal digital assistant (PDA) device, a mobile or cellular telephony device or another type of computing device.

The network interface 102 operates to receive a request from the client computers 160 to transmit the request to the controller 105 or transfer BBS items from the controller 105 to the client computers 160. The BBS items may include map, image, text, audio, etc. Such items are grouped together for a particular message by using a suitable technology such as a primary key, and when the items for the particular message are required, the corresponding items are provided together. The operation of the controller 105 may be performed by a predetermined algorithm. The algorithm is configured in such a manner that in response to receiving a request from the client computer 160 to view the BBS, the controller 105 transmits the request. This is so that the BBS server 110 extracts necessary BBS items from the database 111 and transmits them to the client computer 160 over the network interface 102.

As described below, if a request for a map is received from the client computer 160, then the controller 160 transmits the request to the map server 114. This is so that the map server 114 operates to provide a map corresponding to user's request by using the coordinate value and zoom level. To achieve such function, the map server 114 employs suitable software that manages map data stored in its database 112 and provides a map of the location of interest.

The BBS server 110 may include database management software to manage its data postings. The database management software controls the organization, storage, retrieval and requests in relation to the BBS. The BBS server 110 may connect to a database 111 storing the necessary items. The items stored in the database 111 are grouped together for each posting using a suitable technology.

The specific procedures, according to one particular embodiment of the invention, between the host computer center 100 and the client computer 160 for providing the BBS are explained below in more detail. However, it should be noted that the operations such as providing a window to a user by a selection of the user are embodied by the communications with the host computer center 100.

Figure 2:
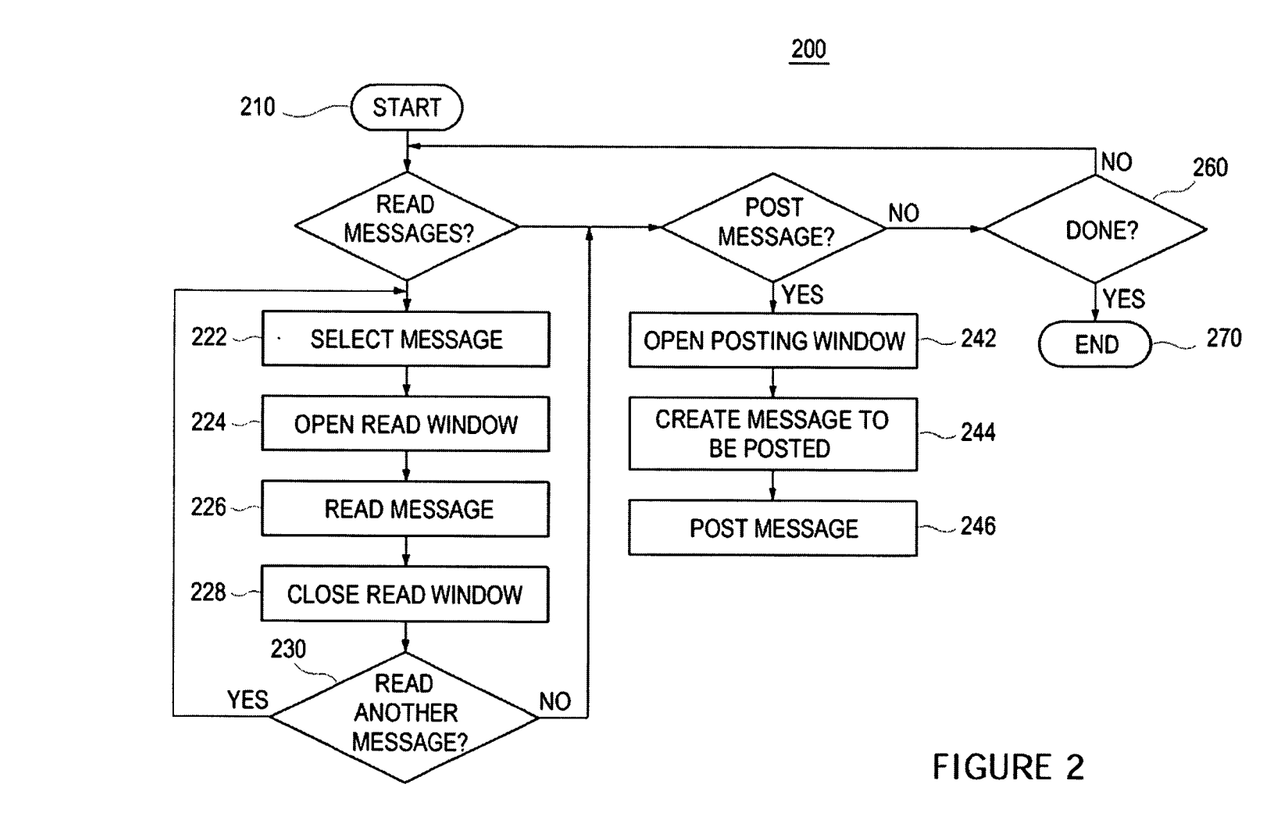
FIG. 2 is a flow diagram illustrating an overview of the bulletin board system according to one embodiment of the present invention

As illustrated in FIG. 2, the user begins an operation on the client computer 160 at a start state 210. The BBS client software is written in C++ and runs in connection with an operating system. However, it should be noted that similar software can be programmed in different languages and designed to run under various operating systems and still be within the purview of the present invention.

Figure 3:
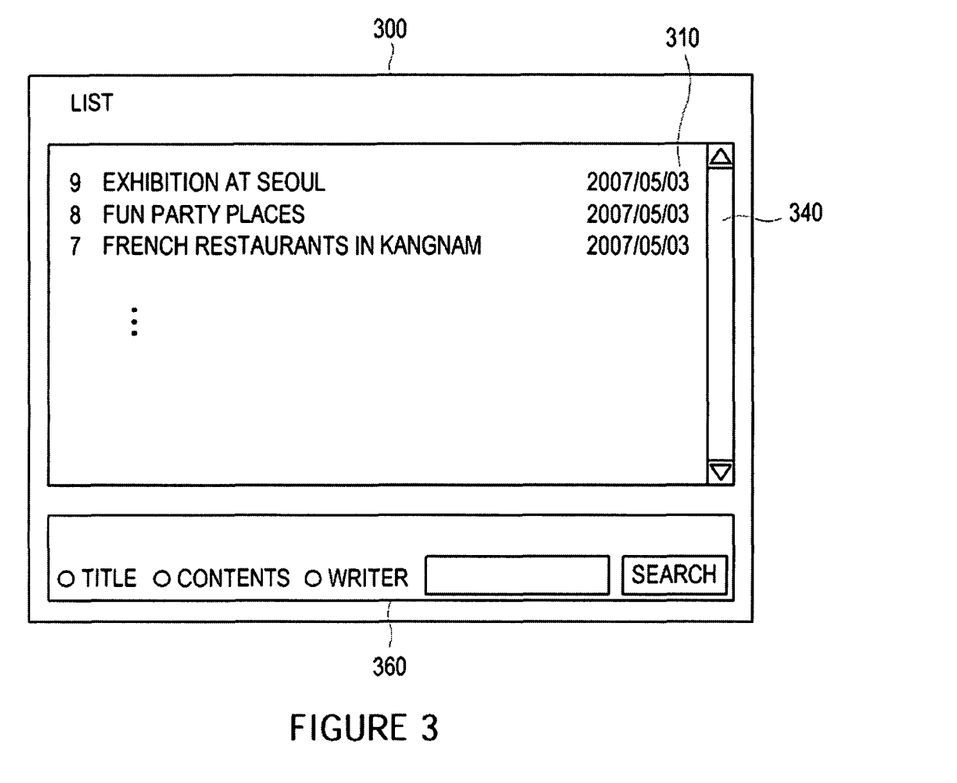
FIG. 3 depicts one example of the window provided at the state 210 in FIG. 2.

When the user starts at the state 210, a window opens on the client computer 160 including lists of the various messages available to be read. FIG. 3 shows one example of the window provided at the state 210. As shown in FIG. 3, a web page 300 shows a number of messages 310 with a title and a date of the posted message. While using a scroll bar 340, the user can scroll through many messages and select one to read. Preferably, the web page 300 may include a search box 360, which allows a user to search for messages by using at least one of the conditions such as a title, content and writer.

Once the user has started the BBS at state 210, a decision is then made at a decision state 220 to whether or not read a particular message. If a choice is made to read a particular message at a decision state 220, then the message is selected at state 222. A message can be selected by highlighting it with a mouse and pressing the enter key, or clicking on the selected message with a mouse button. While these commands are primarily used in many operating system and client application environments, it should be noted that other methods of selecting messages may also be available. Once a particular message has been selected to be read at a state 222, a read window is opened at a state 224.

Figure 4:
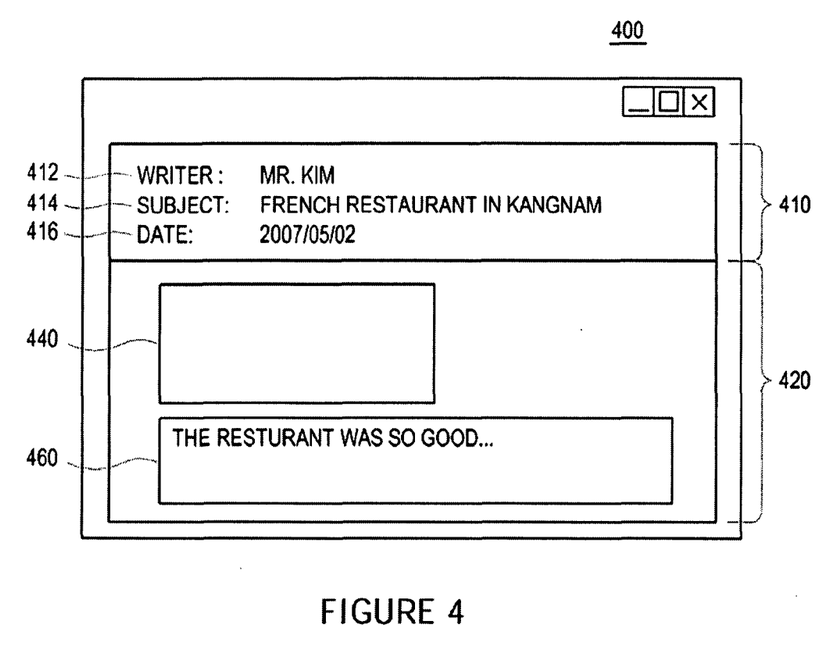
FIG. 4 illustrates one example of the read window opened at a state 224 in FIG. 2.

FIG. 4 illustrates one example of the web page 400 of the read window, which is opened at a state 224. As shown in FIG. 4, in this system, the read window 400 contains two separate areas known as the header section 410 and the body section 420 of the message. The header section 410 includes information such as the name 412 of the person posting the message, the subject 414 of the message and the date 416 in which the message was posted. The body section 420 of the message contains the text 460 of the message along with any included object such as a map, picture, a sound or a video. In FIG. 4, besides the text 460, a map 440 is disclosed in the body section 420. The map is retrieved from the map server 114 and provided to the user by using the coordinate value and zoom level which are pre-stored in the message. That is, when a user clicks a message, the coordinate value and zoom level of the map included in the message are transferred to the map server 114 and the map server 114 provides a corresponding map to the client computer 160. As such, differently from many other BBS systems, the map itself can be embedded directly within the body section 420 of the message.

Once the read window is opened at a state 224, the user reads the message including a map at a state 226 and then closes the read window at a state 228. Once the read, window is closed, this message is typically marked within the BBS system as being read. The user can then choose to only view messages, which have not been read, while they are browsing the available messages. Once the read window is closed at a stage 228, an inquiry is made at a decision state 230 to whether read another message. If the decision is made to read another message, then the process 200 of reading and posting messages loops back to select a message at a state 222. If a decision is made to not read another message at a decision state 230, then the process 200 inquires whether to post a message at a decision state 240.

If a decision is made to post a new message at a decision state 240, then a posting window is opened at a state 242, which resembles the read window discussed above. The posting window includes both the header and body sections of the message that can be filled in by the user Once the posting window is opened at a state 242, a message including map can be created at a state 244 in response to the user's operation of filling in the header and body sections of the message. After the message is created at a state 244, it is posted at process 246 so that it can be available for use on a publicly accessible located on a computer network. The process of creating a message and posting a message is discussed below in more detail in view of FIGS. 5-7. After the message has been posted at a state 246, an inquiry is made as to whether the user is done at a decision state 260. If the user is done, the process 200 ends at an end state 270.

Figure 5:
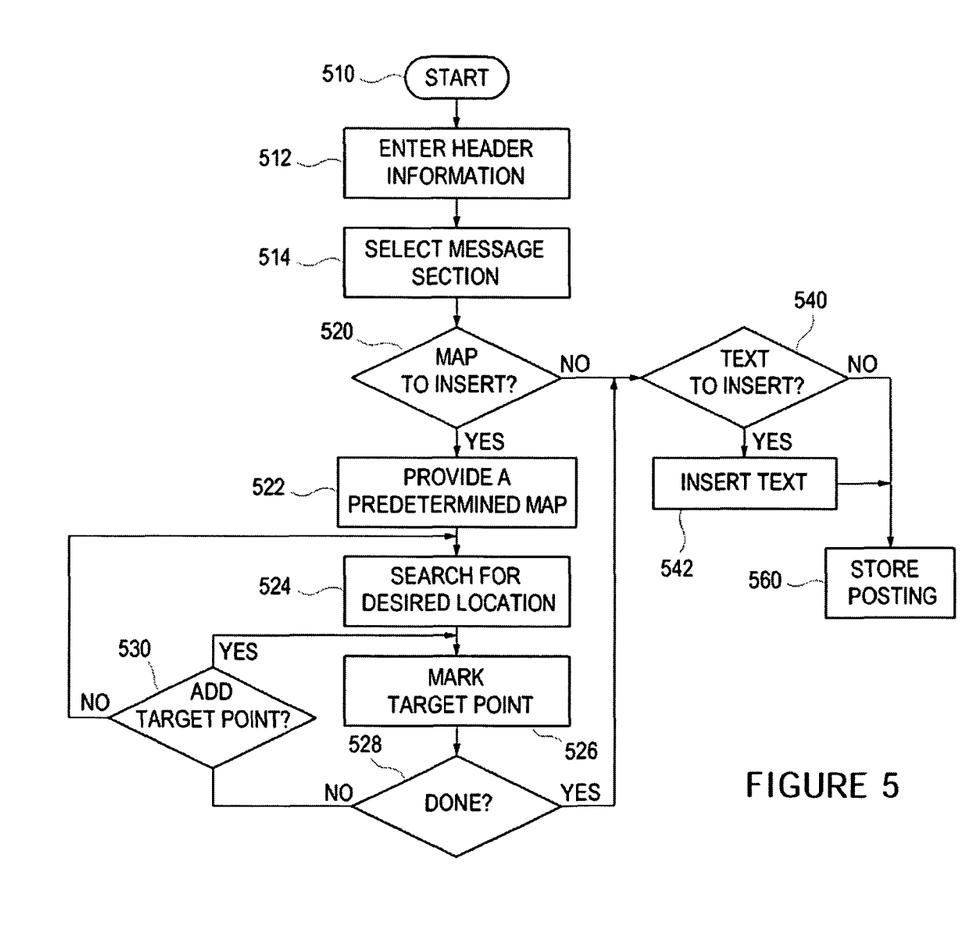
FIG. 5 is a flow diagram illustrating a process of creating a message to be posted according to one embodiment of the present invention.

Referring to FIG. 5, the process of creating a message to be posted begins at a start state 510 and then moves to state 512 where header information is placed in the header section of the message. As discussed above, the header information in the present embodiment includes the name of the person posting the message, the subject of the message, and the date and time the message was posted. Once the header information has been entered at a state 512, the body section is selected at a state 514 and an inquiry is made at a decision state 520 to whether insert a map into the body section.

If the user wishes to add the map into the body section, a predetermined map is provided from the map server 114 at a state 522. That is, the map server 114 provides a predetermined map as a default to the user upon receiving the client's request to include the map into the body section. After being provided with the predetermined map, the user searches for a desired location on the map at a state 524 to indicate a target location on the map.

The search process 524 can be performed by using a search window. At this time, the search window is opened so that the user directly inputs one or more location attributes, such as the name of the location, to be searched. Further, the map server 114 extracts and provides the map corresponding to the search term(s). To do so, the map server 114 may connect to an outside database such as Yahoo Keo-Ki DB, which stores a plurality of POI (Point Of Interest) information. As another example, instead of using a search window, the user may find a desired location by making a movement on the map. As the user moves on the map, the map server 114 receives the coordinate values from the client computer 160 and provides the revised map responsive to the new location. The coordinate values and zoom level of the final map obtained after a searching process are stored in the database. This is so that when another user clicks the message, the corresponding map can be retrieved from the map server 114 by using its coordinate values and zoom level.

After being provided with the desired map at a state 524, the user marks the target point with a predetermined symbol at a state 526. The operation is carried out by which the user makes a click on the target point in the map. In response to receiving the click from the client computer 160, the map server 114 reads coordinate value of the location and temporarily stores the value. The target point having the received coordinate value will be represented with a predetermined symbol on the map by the map server 114. Thereafter, an inquiry is made as to whether the progress of inserting a map to the posting is done at a state 528. Otherwise, it moves to a state 530 to mark one or more other target points on the map. Further, if the user determines to finish inserting the map, then the process moves to the stage 540.

Figure 6:
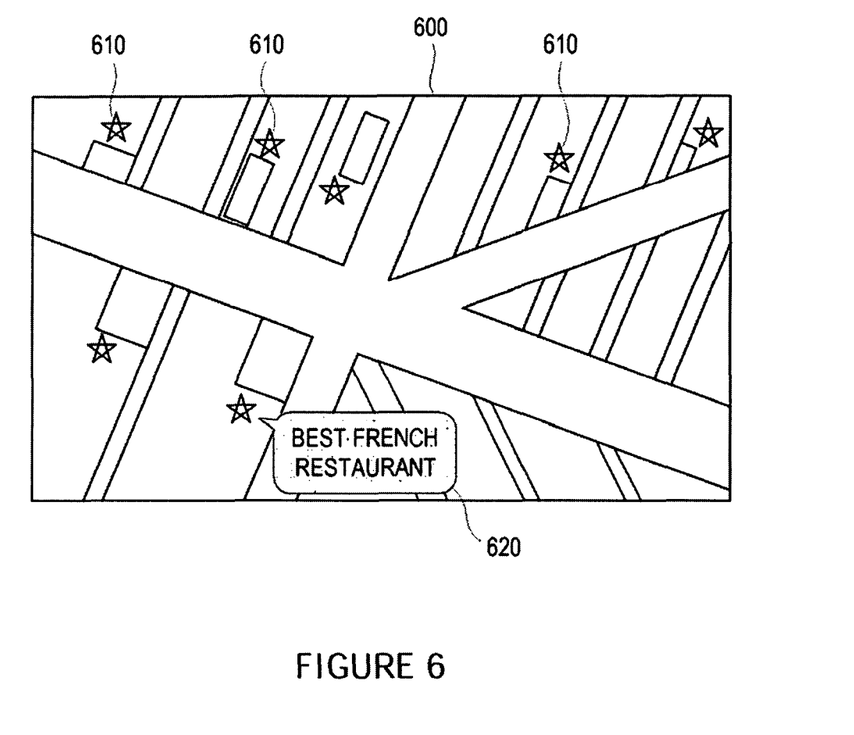
FIG. 6 depicts one example of the created map in accordance with one embodiment of the present invention.

FIG. 6 depicts one example of the created map 600 in accordance with one embodiment of the present invention. In FIG. 6, the target points 610 are indicated with the symbol of stars. However, it should be noted that various symbols can be used to indicate the target point in the map 600. Further, the present invention may be configured to provide an additional process such as adding an annotation 620 to the target point in the map 600, as shown in FIG. 6. In FIG. 6, the annotation 620 includes the contents of "Best French Restaurant." The map items included in the map such as the symbols showing the target points and annotations may be geo-tagged information. The geo-tagged information may include information on the coordinate values and scaling factor of the map. Thus, when a user selects and reads a message including a map, map items corresponding to target points can be properly displayed on the map based on such geo-tagged information.

After completing the map inserting process, an inquiry is made at a decision state 540 to whether insert text into the message section. If the user wishes to add the text into the message section, then it is inserted at a state 542. Normally, a user will insert some text, which makes up a part of the message being posted to a desired group. If the message is about favorite restaurants, then the text covers brief information on each restaurant such as a name, type of food, quality of the service, etc. Further, if there is no text to insert into the message at a decision state 540, then the process moves to state 560 and stores the created posting. In FIG. 5, inquiries are made only with regard to map and text, although the present invention is certainly not limited thereto. That is, one skilled in the art may understand that other inquires such as "Image to insert?" and "Audio to insert?" can be additionally made.

Figure 7:
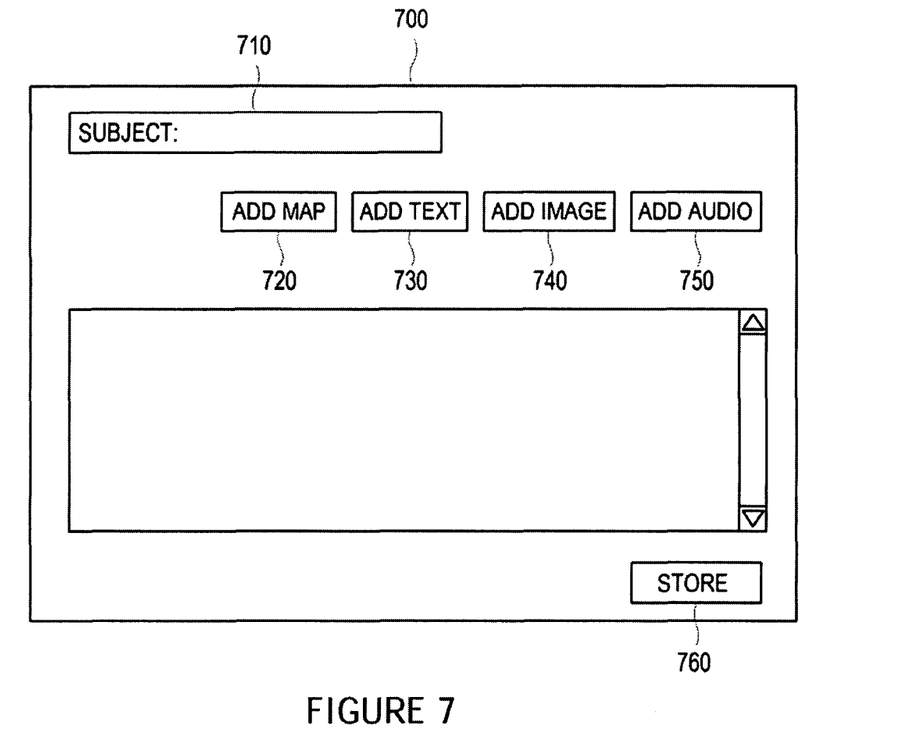
FIG. 7 shows one example of a web page provided during the process of creating a message.

FIG. 7 shows one example of a web page provided during the process of creating a message. As shown in FIG. 7, a web page 700 includes a "Subject" line 710, "Add Map" button 720, "Add Text" button 730, "Add Image" button 740 and "Add Audio" button 750. If a user clicks the "Add Map" button 720, then the decision is made to insert a map into the message at a state 520. Similarly, by clicking the "Add Text" button 730, the decision to insert the text is made at a state 540. The "Store" button 760 enables the created message to be stored at a state 560. Once the "Store" button 700 is clicked, the process 246 of posting a message is carried out, as discussed below in more detail in view of FIG. 8.

Figure 8:
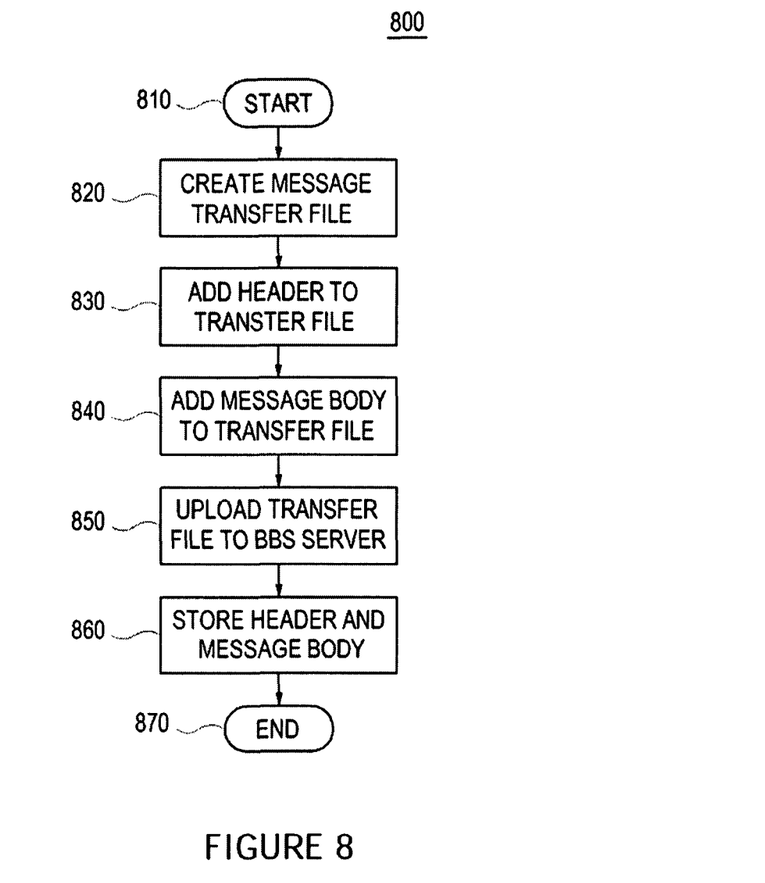
FIG. 8 is a flow diagram showing a process of posting a message according to one embodiment of the present invention.

FIG. 8 illustrates the process of posting a message in accordance with one embodiment of the present invention. The posting process 800 begins at a start state 810 and moves to a state 820 where a message transfer file is created. The message transfer file is the data structure used to transfer the message to the network within the host computer center 100. Once the message transfer file has been created, the header information from the message is placed within the message transfer file at a state 830. As discussed previously, the header information includes the subject of the message, the date and time the message was posted, and the name of the person posting the message.

Once the header information has been placed within the message transfer file at state 830, the posting process 800 moves to the state 840 where the body of the message is added to the transfer file. The body section of the message may be composed using a suitable technology such as a rich text format (RTF) stream. The RTF standard allows text and graphics, including font styles, emphasis, spacing and other features of the data within the control to be outputted in a standard form, which retains all of the formatting commands. Thus, the data outputted in a rich text format can be recreated to include all of the appropriate graphics, object and font styles. The prepared transfer file is uploaded to the BBS server 110 at a state 850. Uploading the transfer file to the BBS server 110 typically involves sending the file from a client computer 160 through the network 120 and the network interface 102 to the controller 105. Since protocols for sending the files from an end user to a computer network are well-known within the art, the detailed explanations thereof will be omitted herein. At a state 860, the header and message body sections of the message transfer file are stored in the BBS server 110.

While the methods of the present invention have been described above with reference to specific embodiments, some or all of the elements or operations thereof may be implemented using a computer system having a general purpose hardware architecture. FIG. 9 illustrates an example of a computing system architecture, which may be used to implement one or more of the operations described herein. In one implementation, hardware system 900 comprises a processor 910, a cache memory 915, and one or more software applications and drivers directed to the functions described herein.

Additionally, hardware system 900 includes a high performance input/output (I/O) bus 940 and a standard I/O bus 970. A host bridge 920 couples the processor 910 to the high performance I/O bus 940, whereas the I/O bus bridge 950 couples the two buses 940 and 970 to each other. A system memory 960 and a network/communication interface 930 are coupled to the bus 940. Hardware system 900 may further include a video memory (not shown) and a display device coupled to the video memory. Mass storage 980 and I/O ports 990 are coupled to the bus 970. Hardware system 900 may optionally include a keyboard and pointing device, as well as a display device (not shown) coupled to the bus 970. Collectively, these elements are intended to represent a broad category of computer hardware systems including, but not limited to, general purpose computer systems based on the Pentium® processor manufactured by Intel Corporation of Santa Clara, Calif., as well as any other suitable processors.

The elements of hardware system 900 are described below in a greater detail. In particular, network interface 930 provides communication between hardware system 900 and any of a wide range of networks, such as an Ethernet (e.g., IEEE 802.3) network, etc. In case of the host computer center 100, the network interface 930 interfaces between the hardware system 900 and the network for allowing the hardware system 900 to manage those databases. The mass storage 980 provides permanent storage for the data and programming instructions to perform the above-described functions implemented in the host computer center 100, Whereas a system memory 960 (e.g., DRAM) provides temporary storage for the data and programming instructions when executed by processor 910. I/O ports 990 are one or more serial and/or parallel communication ports providing communication between additional peripheral devices, which may be coupled to the hardware system 900.

Hardware system 900 may include a variety, of system architectures. Further, various components of hardware system 900 may be rearranged. For example, cache 915 may be on-chip with processor 910. Alternatively, cache 915 and processor 910 may be packed together as a "processor module," with processor 910 being referred to as the "processor core." Furthermore, certain implementations of the present invention may not require nor include all of the above components. For example, the peripheral devices shown coupled to the standard I/O bus 970 may be coupled to the high performance I/O bus 940. In addition, in some implementations, only a single bus may exist, with the components of hardware system 900 being coupled to the single bus. Furthermore, hardware system 900 may include additional components, such as additional processors, storage devices or memories. As discussed below, in one embodiment, the operations of the integrated search system described herein are implemented as a series of software routines run by hardware system 900. These software routines comprise a plurality or series of instructions to be executed by a processor in a hardware system, such as processor 910. Initially, the series of instructions are stored in a storage device, such as the mass storage 980. However, the series of instructions can be stored in any suitable storage medium, such as a diskette, CD-ROM, ROM, EEPROM, etc. Furthermore, the series of instructions do not need to be stored locally. Rather, they could be received from a remote storage device, such as a server on a network, via the network/communication interface 930. The instructions are copied from the storage device, such as mass storage 980, into the memory 960 and then accessed and executed by the processor 910.

An operating system manages and controls the operation of hardware system 900, including the input and output of data to and from software applications (not shown). The operating system provides an interface between the software applications being executed on the system and the hardware components of the system. According to one embodiment of the present invention, the operating system is the Windows® 95/98/NT/XP operating system, which is available from Microsoft Corporation of Redmond, Wash. However, the present invention may be used with other suitable operating systems, such as the Apple Macintosh Operating System available from Apple Computer Inc. of Cupertino, Calif., UNIX operating systems, LINUX operating systems and the like.

The present invention provides a map in relation to the contents of a message so that a user can immediately know the location of the site being discussed in the message. That is, the present invention takes advantage of the merits of both a map and a BBS. Further, while the present invention has been shown and described with respect to a preferred embodiment, those skilled in the art will recognize that various changes and modifications may be made without departing from the spirit and scope of the invention as defined in the appended claims.

What is claimed is:

1. A method comprising:
receiving, by a bulletin board system (BBS) comprising at least one computing device, a request from a user of the BBS to post a BBS message to the BBS;
providing, by the BBS, a BBS message posting user interface in response to the request from the user, the BBS message posting user interface to be used by the user to create the BBS message, the BBS message posting user interface including at least one button for display in the BBS message posting user interface and selectable by the user to create the BBS message, the at least one button comprising a button selectable by the user to include a map in the BBS message;
receiving, by the BBS, a notification via the button included in the BBS message posting user interface and selectable by the user to include a map in the BBS message, the notification indicating that the user wishes to include a map in the BBS message;
in response to the notification received via the user-selectable button to include a map in the BBS message, providing, by the BBS, a location mapping user interface to display a map for use by the user for indicating a target location on the map displayed in the location mapping user interface;
inserting a map defined by the user with the location mapping user interface in the BBS message; and
storing the map with the BBS message in a database.

2. The method of claim 1, wherein providing a location mapping interface to the user facilitating configuration of a user-defined map comprises:
receiving a name of the location from the user;
retrieving the map corresponding to the name from the map server; and
displaying the map including the location to the user.

3. The method of claim 1, providing a location mapping interface to the user facilitating configuration of a user-defined map comprises:
in response to the user's manipulation of coordinate values of a displayed map, retrieving a corresponding map from the map server; and
displaying the corresponding map to the user.

4. The method of claim 1, the BBS message posting user interface further comprising an interface to add content to the BBS message, the method further comprising:
receiving, by the BBS and via the BBS message posting user interface, the content to be added in the message from the user; and
inserting the received content in the message.

5. The method of claim 4, wherein the content added to the message have a common primary key.

6. The method of claim 1, further comprising:
in response to receiving an indication of pointing on the map from the user, adding a target point to the map.

7. The method of claim 6, wherein adding a target point to the map comprises:
receiving coordinate values of the target point from the map server;
storing the coordinate values of the target point in the database; and
displaying a symbol on a location corresponding to the coordinate values of the target point on the map.

8. The method of claim 6, further including: adding map items including annotations and text to the map.

9. The method of claim 8, wherein the map items are represented in a form of geo-tagged information.

10. A bulletin board system (BBS) comprising:
at least one server computer comprising one or more processors to execute and memory to store instructions to:
receive a request from a user of the BBS to post a BBS message to the BBS;
provide a BBS message posting user interface in response to the request from the user, the BBS message posting user interface to be used by the user to create the BBS message, the BBS message posting user interface including at least one button for display in the BBS message posting user interface and selectable by the user to create the BBS message, the at least one button comprising a button selectable by the user to include a map in the BBS message;
receive a notification via the button included in the BBS message posting user interface and selectable by the user to include a map in the BBS message, the notification indicating that the user wishes to include a map in the BBS message;
in response to the notification received via the user-selectable button to include a map in the BBS message, provide a location mapping user interface to display a map for use by the user for indicating a target location on the map displayed in the location mapping user interface;
insert a map defined by the user with the location mapping user interface in the BBS message; and
store the map with the BBS message in a database.

11. A non-transitory computer-readable storage medium embodying software operable when executed by one or more processors to:
receive, by a bulletin board system (BBS), a request from a user of the BBS to post a BBS message to the BBS;
provide a BBS message posting user interface in response to the request from the user, the BBS message posting user interface to be used by the user to create the BBS message, the BBS message posting user interface including at least one button for display in the BBS message posting user interface and selectable by the user to create the BBS message, the at least one button comprising a button selectable by the user to include a map in the BBS message;
receive a notification via the button included in the BBS message posting user interface and selectable by the user to include a map in the BBS message, the notification indicating that the user wishes to include a map in the BBS message;
in response to the notification received via the user-selectable button to include a map in the BBS message, provide a location mapping user interface to display a map for use by the user for indicating a target location on the map displayed in the location mapping user interface;
insert a map defined by the user with the location mapping user interface in the BBS message; and
store the map with the BBS message in a database.

12. A method comprising:
providing, by a bulletin board system (BBS) comprising at least one computing device, a BBS message posting user interface in response to receipt of a BBS message posting request from a user, the BBS message posting user interface to be used by the user to create a BBS message, the BBS message posting user interface including at least one button for display in the BBS message posting user interface and selectable by the user to create the BBS message, the at least one button comprising a button selectable by the user to include a map in the BBS message;
providing, by the BBS in response to input received via the button selectable by the user to include a map in the BBS message, a location mapping user interface to display a map for use by the user for indicating a target location on the map displayed in the location mapping user interface;
receiving, by the BBS via the location mapping user interface, input indicative of a user-specified target location on the map displayed in the location mapping user interface;
storing, by the BBS, the BBS message with map information, the map information comprising information about the map for display in the BBS message;
receiving, by the BBS, a user request for display of the BBS message, and in response to receiving the user request, the BBS system:
retrieving the BBS message and the map information;
retrieving the map using the map information; and
providing the BBS message with the map for display, the map being provided for display in a body section of the BBS message.

13. The method of claim 12, wherein the map includes at least one annotation.

14. The method of claim 12, wherein the stored map information comprises a zoom level of the map.

15. The method of claim 12, wherein the map includes at least one symbol at a location corresponding to at least one coordinate value of a target point.

16. A system comprising:
at least one server computer comprising one or more processors to execute and memory to store instructions to:
provide a BBS message posting user interface in response to receipt of a BBS message posting request from a user, the BBS message posting user interface to be used by the user to create a BBS message, the BBS message posting user interface including at least one button for display in the BBS message posting user interface and selectable by the user to create the BBS message, the at least one button comprising a button selectable by the user to include a map in the BBS message;
provide, in response to input received via the button selectable by the user to include a map in the BBS message, a location mapping user interface to display a map for use by the user for indicating a target location on the map displayed in the location mapping user interface;
receive, via the location mapping user interface, input indicative of a user-specified target location on the map displayed in the location mapping user interface;
store the BBS message with map information, the map information comprising information about the map for display in the BBS message;
receive a user request for display of the BBS message, and in response to receiving the user request:
retrieve the BBS message and the map information;
retrieve the map using the map information; and
provide the BBS message with the map for display, the map for display in a body section of the BBS message.

17. The system of claim 16, wherein the map includes at least one annotation.

18. The system of claim 16, wherein the stored map information comprises a zoom level of the map.

19. The system of claim 16, wherein the map includes at least one symbol at a location corresponding to at least one coordinate value of a target point.

20. A non-transitory computer-readable storage medium embodying software operable when executed by one or more processors to:
provide a BBS message posting user interface in response to receipt of a BBS message posting request from a user, the BBS message posting user interface to be used by the user to create a BBS message, the BBS message posting user interface including at least one button for display in the BBS message posting user interface and selectable by the user to create the BBS message, the at least one button comprising a button selectable by the user to include a map in the BBS message;
provide, in response to input received via the button selectable by the user to include a map in the BBS message, a location mapping user interface to display a map for use by the user for indicating a target location on the map displayed in the location mapping user interface;
receive, via the location mapping user interface, input indicative of a user-specified target location on the map displayed in the location mapping user interface;
store the BBS message with map information, the map information comprising information about the map for display in the BBS message;
receive a user request for display of the BBS message, and in response to receiving the user request:
retrieve the BBS message and the map information;
retrieve the map using the map information; and
provide the BBS message with the map for display, the map for display in a body section of the BBS message.

21. The non-transitory computer-readable storage medium of claim 20, wherein the map includes at least one annotation.

22. The non-transitory computer-readable storage medium of claim 20, wherein the stored map information comprises a zoom level of the map.

23. The non-transitory computer-readable storage medium of claim 20, wherein the map includes at least one symbol at a location corresponding to at least one coordinate value of a target point.

* * * * *